(12) United States Patent
Slatter

(10) Patent No.: US 7,147,193 B2
(45) Date of Patent: Dec. 12, 2006

(54) MULTI-PURPOSE SUPPORT PLATE

(76) Inventor: Stephen O. Slatter, 8631 NW. 21st Ct., Sunrise, FL (US) 33322

( * ) Notice: Subject to any disclaimer, the term of this patent is extended or adjusted under 35 U.S.C. 154(b) by 123 days.

(21) Appl. No.: 11/023,256

(22) Filed: Dec. 27, 2004

(65) Prior Publication Data
US 2005/0103249 A1 May 19, 2005

Related U.S. Application Data

(63) Continuation of application No. 10/403,490, filed on Mar. 31, 2003, now Pat. No. 6,851,654.

(60) Provisional application No. 60/369,054, filed on Apr. 1, 2002.

(51) Int. Cl.
A47F 7/00 (2006.01)

(52) U.S. Cl. .................. 248/314; 43/27.4; 114/255; 248/534; 248/538

(58) Field of Classification Search .............. 248/314, 248/500, 534, 535, 539, 538; 43/21.2, 27.4; 114/255
See application file for complete search history.

(56) References Cited

U.S. PATENT DOCUMENTS

| | | | | |
|---|---|---|---|---|
| 3,298,646 A | * | 1/1967 | Buren, Jr. ................... | 248/72 |
| 5,445,102 A | * | 8/1995 | Rupp ......................... | 114/255 |
| 5,685,107 A | | 11/1997 | Sweet | |
| 5,685,517 A | * | 11/1997 | Salibra ....................... | 248/519 |
| 5,921,196 A | * | 7/1999 | Slatter ........................ | 114/255 |
| 6,007,042 A | * | 12/1999 | Baynard et al. ............ | 248/535 |
| 6,213,441 B1 | | 4/2001 | Baynard et al. | |
| 6,668,745 B1 | * | 12/2003 | Slatter ........................ | 114/255 |

OTHER PUBLICATIONS

T & C Metals, A Division of Town & Country Ind., wholesale aluminum distributors, furniture shapes, catalog cut sheet.

Materials Technology Solutions, aluminum products and alloys, websit: http://www.materialtech.com/alum.html#extrude.

* cited by examiner

Primary Examiner—Ramon O Ramirez
(74) Attorney, Agent, or Firm—Robert M. Schwartz; Alfred K. Dassler

(57) ABSTRACT

A multi-purpose support plate for use with a boating accessory assembly is disclosed including a first mounting end portion having a first strengthening rib, a center portion having a top layer and a bottom layer, and a second mounting end portion having a second strengthening rib. The first and second mounting end portions include a first or second thickened mounting area, respectively, from which the first or second strengthening rib extends to the top and bottom layers. The center portion of the support plate further includes a center bore. The center bore passes through the top layer and bottom layer to accommodate at least one boating accessory.

34 Claims, 5 Drawing Sheets

MULTI-PURPOSE SUPPORT PLATE

CROSS-REFERENCES TO RELATED APPLICATIONS

This application claims the benefit of U.S. patent application Ser. No. 10/403,490, filed Mar. 31, 2003 now U.S. Pat. No. 6,851,654, entitled MULTI-PURPOSE SUPPORT PLATE, which claims the benefit of U.S. Provisional Application Ser. No. 60/369,054, filed on Apr. 1, 2002, entitled MULTI-PURPOSE SUPPORT PLATE.

TECHNICAL FIELD OF THE INVENTION

This invention relates to the field of sport fishing, and particularly to an outrigger mounting system having a multi-purpose support plate capable of withstanding high forces and permitting rotational movement of an outrigger.

BACKGROUND OF THE INVENTION

Saltwater sport fishing typically consists of anglers positioned on boats that are then dispatched to prolific offshore fishing areas. One useful method of catching gamefish involves a technique known as trolling. Trolling is the practice of baiting hooks that are subsequently lowered and dragged behind the stern of a slow moving vessel by the angler. In order to increase the chances of hooking a fish, it is beneficial to have as many lines in the water as possible. To a gamefish, the wake of a vessel generally creates the appearance of a large school of smaller fish to be preyed upon. The angler can strategically simulate bands of straggling or displaced fish from the school with numerous baited lines. These simulated straggling fish are misinterpreted by the gamefish to be the disadvantaged and weakened fish that gamefish frequently utilize as a food source.

As stated above, an angler will often drag as many baited lines from behind the boat as possible, thereby increasing the chances of hooking a fish. However, as more baited lines are used, the probability of the lines becoming entangled with one another increases. This is a problem that occurs in a variety of situations, such as with a narrow beam boat or any boat that is in the process of being turned. As a result, sport fishing outriggers have been developed to assist in keeping the various lines separated. However, the positioning and lowering of outrigger booms presents additional problems of rotational movement and preventing the booms from contacting the water. This problem has brought forth various attempts to create mechanisms to rotate the boom and that prevent the boom from contacting the water.

Outriggers consist of a long pole, or boom, having one end secured to the boat with deployment resulting from an outward lateral extension of the boom from a side of the boat. Baited fishing lines often have integrated release clips that are attached to the outriggers, thereby providing sufficient separation between the lines to prevent tangling. When a fish is hooked on the bait line, the line clip releases from the outrigger, thus allowing the angler to reel in the fish.

Outriggers are required to be freely stowable to a position beside the boat for close quarters operation and docking. For practicality, the outrigger should be swung laterally outward to its deployed position. The prior art includes various types of mounting schemes including outrigger units for horizontal and vertical mounting, on center consoles, flybridges, half towers, tuna towers, radar arches, and/or T-tops. Prior patents disclose a variety of methods for mounting such outriggers into place (see e.g. U.S. Pat. Nos. 6,213,441 and 5,685,107), with each having distinct drawbacks. Such drawbacks include overall mechanical complexity; powered operation; non-durable construction; and/or ineffective position adjustment and locking mechanisms that slip and/or wear out.

Outrigger poles often extend outwardly from the boat to a significant distance while in their fishing position. Due to the forces applied to the mount by a combination of the weight of the outrigger assembly with the outrigger, the rotational movement of the boat, the wind force and the forces associated with trolling, an extremely sturdy structure is essential in order to provide suitable performance over a period. Various outrigger mounts currently supply bracing struts and rods to provide the requisite strength. These structures can be cumbersome in operation, particularly when it becomes necessary to reposition the outrigger.

A number of outrigger mounts employ telescoping or sliding joints that are particularly susceptible to corrosion and sticking, particularly in conjunction with salt water fishing. Furthermore, outrigger mounts of the prior art often require an array of independent attachments to the boat structure in specific relation to each other, thus necessitating skilled and protracted installation, as well as additional structural reinforcement to the boat.

In addition, the prior art outrigger mounts present extended sleeve sockets for the slidable receipt of the proximal ends of the outriggers. Due to the degree of support required for the outrigger, a secure fit between the proximal end and the sleeve socket is essential. Thus, the outriggers are frequently extremely difficult to remove from the sockets after a prolonged period of usage, particularly in salt water, and often call for dismounting at least a portion of the outrigger mount.

The prior art presents a variety of approaches that have been engaged to suspend an outrigger in place while trolling for fish. Notwithstanding these efforts to provide suitable outrigger mounts, the existing prior art devices are limited in numerous respects. Accordingly, what is lacking that the prior art has not provided is a simple multi-purpose support plate for a boating accessory assembly, such as an outrigger assembly, that is capable of withstanding high forces while permitting rotational movement of an outrigger without using bracing struts and rods or sleeve sockets.

SUMMARY OF THE INVENTION

The present invention eliminates the above-mentioned needs for support plate by providing a multi-purpose support plate for a boating accessory assembly that is capable of withstanding high forces while permitting rotational movement.

In accordance with the present invention, there is provided a multi-purpose support plate for use with a boating accessory assembly. The multi-purpose support plate includes a first mounting end portion having a first strengthening rib, a center portion having a top layer and a bottom layer, and a second mounting end portion having a second strengthening rib. The first and second mounting end portions include a first or second thickened mounting area, respectively, from which the first or second strengthening rib extends to either the top or bottom layer. The center portion of the support plate further includes a center bore. The center bore passes through the top layer and bottom layer to accommodate at least one boating accessory.

The present invention is further directed to a multi-purpose support plate for use with a boating accessory assembly including a first mounting end portion having a first strengthening rib and a first thickened mounting area, wherein said first thickened mounting area has at least one bolt hole to secure a boating accessory; a center portion having a top layer, a bottom layer, and a center bore therethrough, wherein said center bore accommodates said boating accessory; and a second mounting end portion having a second strengthening rib and a second thickened mounting area, wherein said second thickened mounting area has at least one bolt hole to secure said boating accessory.

The present invention is further directed to a method for supporting a boating accessory. The method includes the steps of providing a multi-purpose support plate having at least one strengthening rib and at least one accessory bore, mounting the multi-purpose support plate to a surface, supplying the boating accessory through the accessory bore, and mounting the boating accessory to said multi-purpose support plate.

Accordingly, it is an objective of the present invention to disclose a sport fishing multi-purpose support plate that is capable of both withstanding high forces and permitting rotational movement of boating accessories.

DETAILED DESCRIPTION OF THE PREFERRED EMBODIMENT

Figure 1:
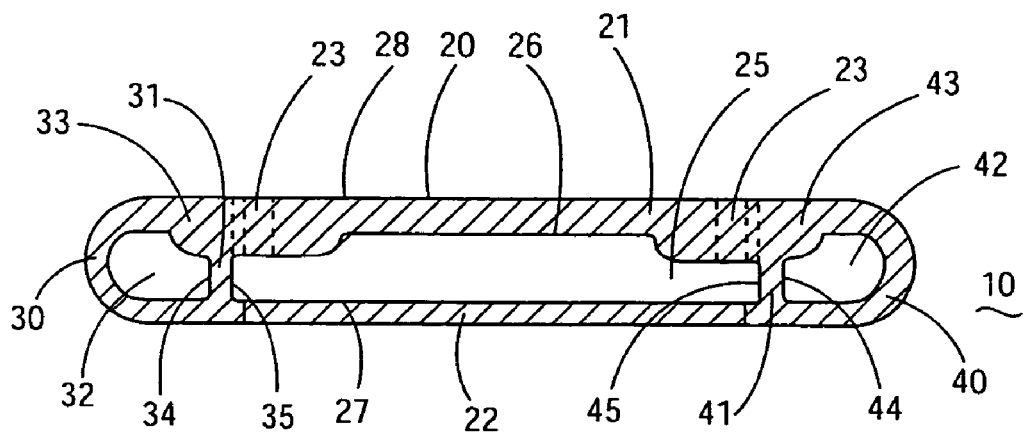
FIG. 1 is an illustration of a cross-sectional view of one embodiment of the present invention.

Referring now to FIG. 1, a preferred embodiment of the present invention is illustrated as the multi-purpose support plate 10. The multi-purpose support plate 10 generally comprises a first mounting end portion 30 having a first strengthening rib 31, a center portion 20 having a top layer 21 and a bottom layer 22, and a second mounting end portion 40 having a second strengthening rib 41.

The first mounting end portion 30 includes a first thickened mounting area 33. In the preferred embodiment, the first thickened mounting area 33 has a first strengthening rib 31 that extends from the first thickened mounting area 33 to a layer, such as top layer 21 or bottom layer 22. In the preferred embodiment of the present invention, the first thickened mounting area 33 is formed from the top layer 21, thus the first strengthening rib 31 extends from first thickened mounting area 33 to the bottom layer 22. Preferably, the first thickened mounting area 33 is located on the inner side 26 of the top layer 21 so that the first strengthening rib 31 is at the desired height. It is also contemplated that one skilled in the art could also position the first thickened mounting area 33 so that it is located on the inner side 27 of the bottom layer 22. In such a situation, the first-thickened mounting area 33 would be formed from the bottom layer 22 and the first strengthening rib 31 would extend from the first thickened mounting area 33 to the top layer 21.

The second mounting end portion 40 includes a second thickened mounting area 43. In the preferred embodiment, the second thickened mounting area 43 has a second strengthening rib 41 that extends from the second thickened mounting area 43 to a layer, such as top layer 21 or bottom layer 22. In the preferred embodiment of the present invention, the second thickened mounting area 43 is formed from the top layer 21, thus the second strengthening rib 41 extends from second thickened mounting area 43 to the bottom layer 22. Preferably, the second thickened mounting area 43 is also located on the inner side 26 of the top layer 21 so that the second strengthening rib 41 is at a desired height that is the same as the desired height for the first strengthening rib 31. It is further contemplated that one skilled in the art could also position the second thickened mounting area 43 so that it is located on the inner side 27 of the bottom layer 22. In such a situation, the second thickened mounting area 43 would be formed from the bottom layer 22 and the second strengthening rib 41 would extend from the second thickened mounting area 43 to the top layer 21. Additionally, it is further contemplated that it may be preferable to provide a mounting plate having thickened mounting areas displaced on layers opposite of one another, thereby resulting in a one strengthening rib extending to the top layer and the other strengthening rib extending to the bottom layer with respect to the thickened mounting areas that form the strengthening ribs.

To reduce the mass of the support plate 10, the top layer 21 of the preferred embodiment can have a variable thickness. In addition, it may also be desirous to provide the bottom layer 22 with a thickness that can be varied as well. In the preferred embodiment, the strengthening ribs 31 and 41 are provided to impart the present invention with the ability to withstand strong forces. To accomplish this goal, strengthening ribs 31 and 41 of the preferred embodiment of the present invention include outer walls 34 and 44 that define cavities 32 and 42. The cavities 32 and 42 provide additional structural strength in a manner similar to that used in the hollow bones of birds.

Figure 2:
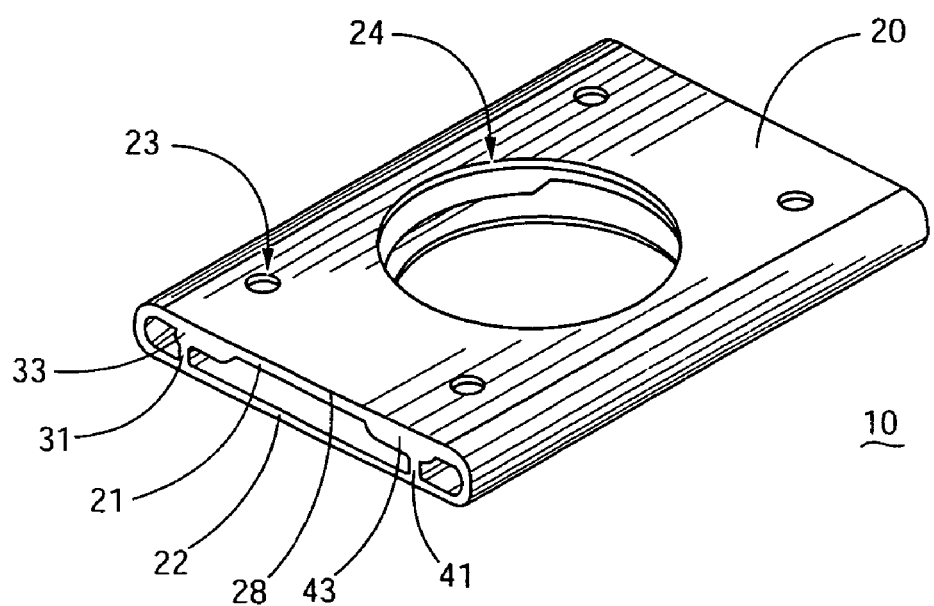
FIG. 2 is an illustration of an isometric view of the invention illustrated in FIG. 1.
Figure 3A:
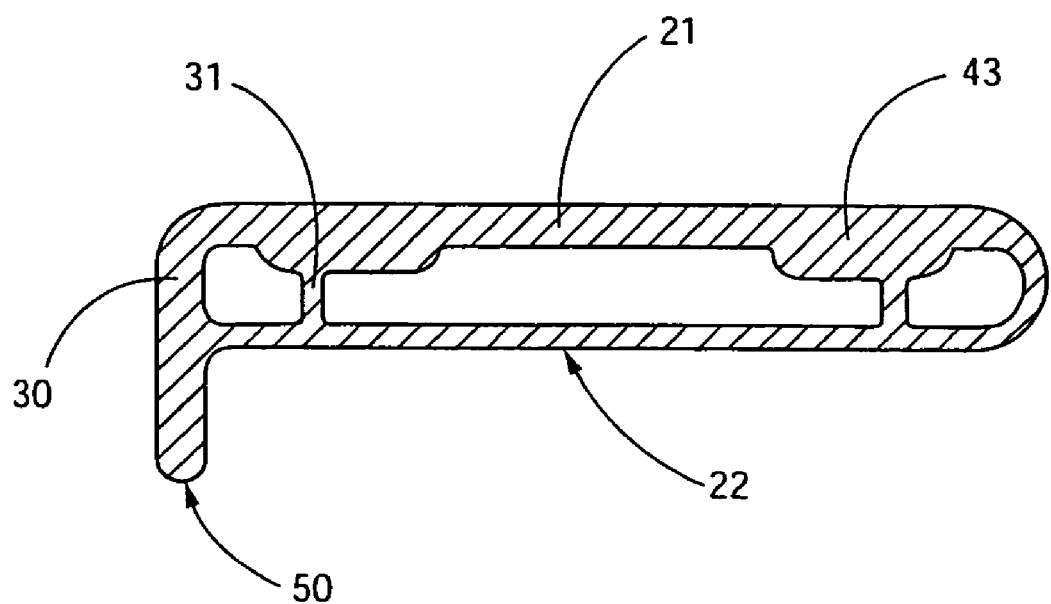
FIG. 3A is an illustration of a cross-sectional view of another embodiment of the present invention.
Figure 3B:
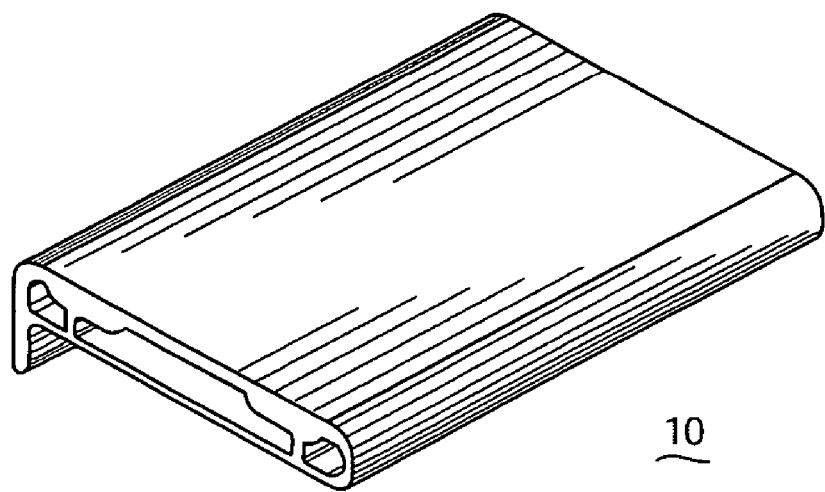
FIG. 3B is an illustration of an isometric view of the invention illustrated in FIG. 3A.
Figure 3C:
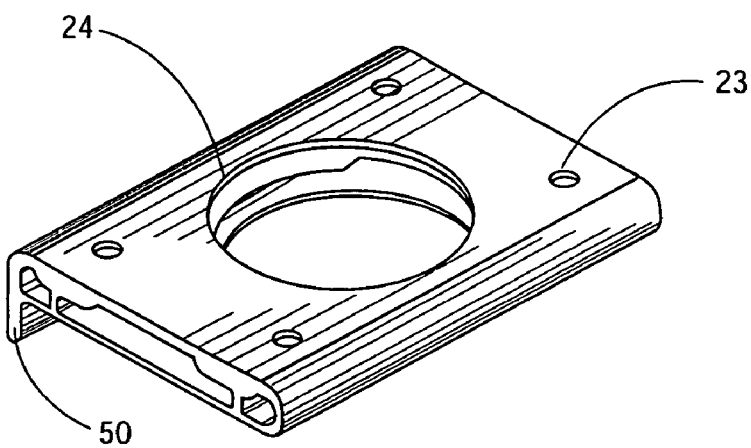
FIG. 3C is an illustration of an isometric view of another embodiment of the present invention illustrated in FIG. 3A.
Figure 4:
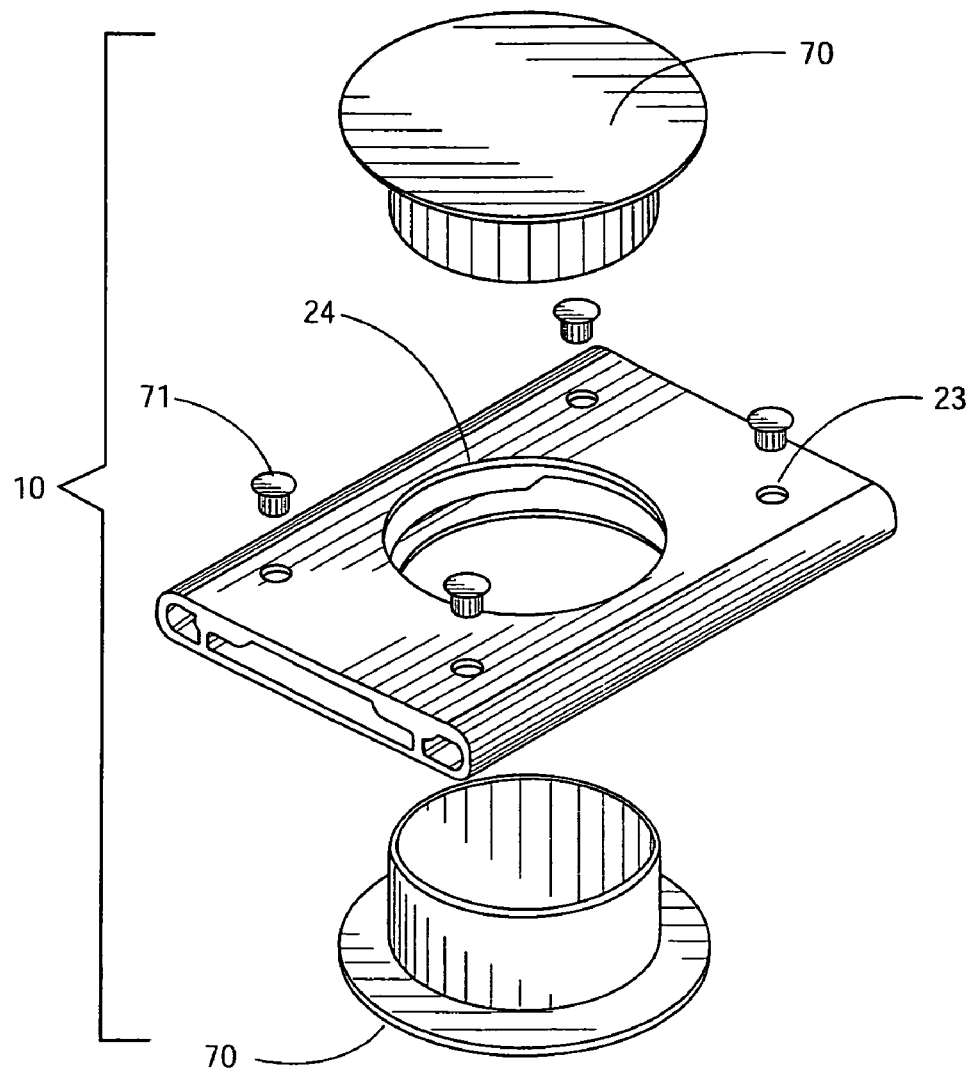
FIG. 4 is an illustration of yet another embodiment of the present invention illustrated in FIG. 1.

As shown in FIGS. 2, 3C, and 4 of the present invention, the center portion 20 has a center bore 24 that passes through both the top layer 21 and the bottom layer 22. While the center bore 24 may also pass through the thickened mounting areas 33 and 43, the center bore 24 does not cut into the strengthening ribs 31 and 41. The benefit of the center bore 24 in general is that it is used to accommodate a boating accessory, such as an outrigger assembly, a light, or the like. Specifically, the center bore 24 permits a portion of the boating accessory assembly, such as handle, to pass through the center bore 24 of the support plate 10. In doing so, the center bore 24 further allows for the boating accessory assembly to be engaged in rotational movement within the support plate 10. This is particularly useful for boating accessories, such as outriggers, that function better when they are less restricted in movement.

Referring back to the center portion 20 in FIG. 1, the arrangement of the top layer 21, bottom layer 22, first inner wall 35, and second inner wall 45 define a central cavity 25. The central cavity 25 in the preferred embodiment also imparts additional structural strength, as with the cavities 32 and 42. One benefit is that the cavities 32 and 42, as well as central cavity 25, provide for a support plate 10 with multiple layers 21 and 22 and ribs 31 and 41, so that if a severe force is conveyed to the support plate 10, such as might occur during trolling for gamefish, the force is distributed between the layers 21 and 22 and the ribs 31 and 41 so that the support plate 10 is better suited to resist the force. As an additional benefit, structural rigidity and resistance to severe forces is further maintained by the single unit construction of the support plate 10 of the present invention.

As illustrated in FIGS. 1, 2, 3C, 4 and 5, the thickened mounting areas 33 and 43 of the preferred embodiment have bolt holes 23 that serve as attachment points for the boating accessory. For instance, the bolt holes 23 are preferably provided through the outer side 28 of the top layer 21 and terminate within the thickened mounting end portions 33 and 43. The bolt holes 23 can be created by drilling holes through the top layer 21 of the center portion 20 and into the thickened mounting end portions 33 and 43. If it is desirable to add threads to the bolt holes 23, this may be accomplished by various means well known in the art. Preferably, the bolt holes are displaced within the thickened end portions 33 and 43 to a position where they cannot interfere with the additional strength and structural rigidity provided by the strengthening ribs 31 and 41. In the preferred embodiment, the bolt holes 23 accommodate bolts that affix the boating accessory assembly into position.

Figure 6:
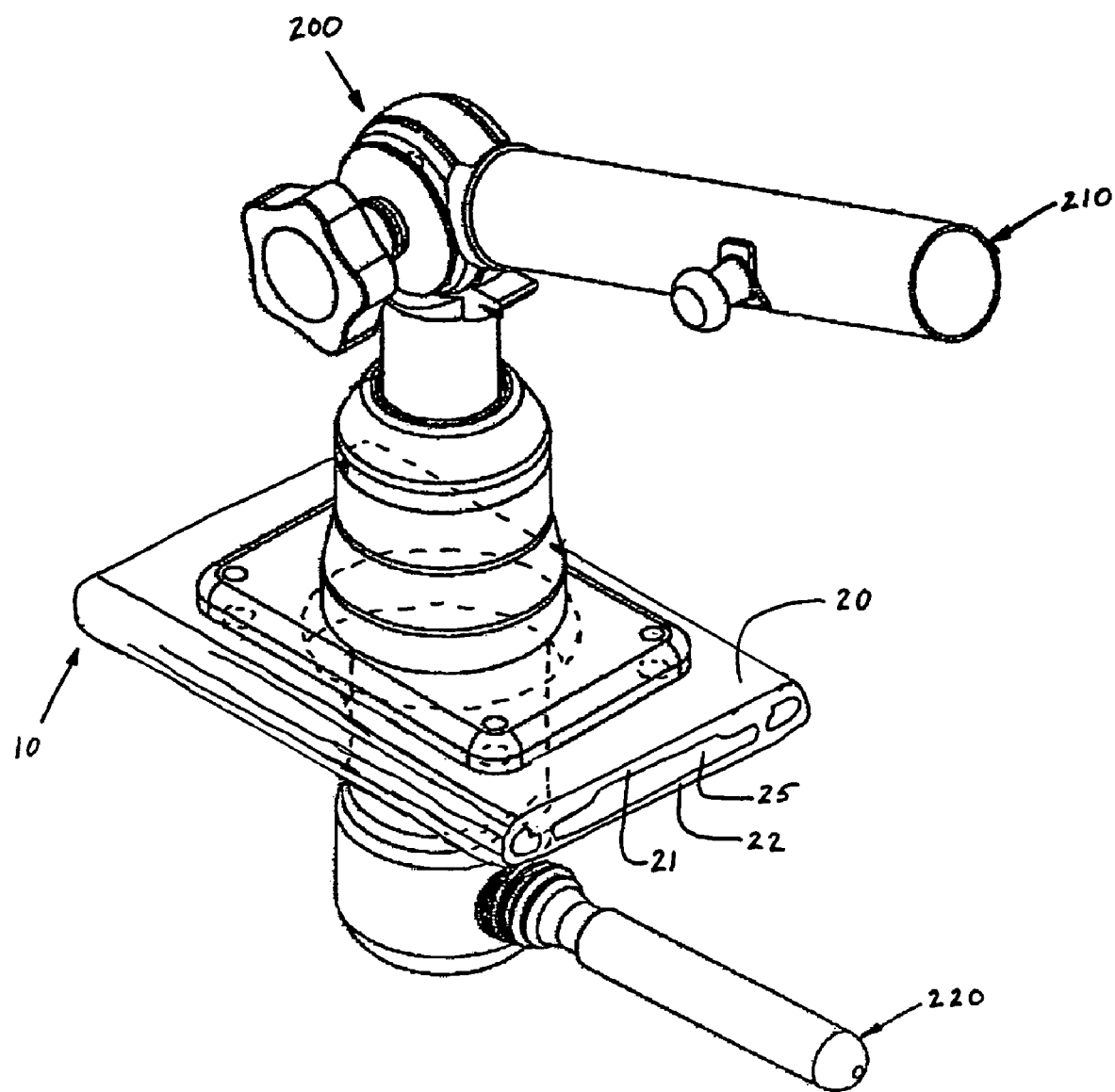
FIG. 6 is an illustration of an isometric view of the invention illustrated in FIG. 2 in operation.

In practice, the preferred embodiment of the present invention is fixed to a boat or a support structure on a boat. The preferred method for attaching the support plate 10 is by welding, although it will be readily apparent to those of ordinary skill in the art that other means, including pins, bolts, clamps, or the like can also be used to secure the support plate to the boat or the support structure on the boat. As illustrated in FIG. 6, multi-purpose support plate 10 is shown accommodating an outrigger assembly 200. Outrigger assembly 200 includes an outrigger mounting portion 210 and a handle 220. In operation, outrigger assembly 200 is mated to multi-purpose support plate 10, preferably by bolts (not shown) as described herein. As shown in FIG. 6, outrigger assembly 200 is positioned to be passed through top layer 21, bottom layer 22, and center portion 20 including central cavity 25 of multi-purpose support plate 10. This arrangement allows for an assembly, such as outrigger assembly 200, to be better suited for stability during the array of forces present in boating activities. As is further illustrated, positioning multi-purpose support plate 10 between outrigger mount 210 and handle 220 not only permits greater support, but improves the functionality of an assembly, such as outrigger assembly 200, by allowing the user to operate the assembly from beneath multi-purpose support plate 10.

FIGS. 3A and 3C illustrate a modification to the preferred embodiment where the first mounting end portion 30 or the second mounting end portion 40 further includes an extension leg 50 for side mounting on the boat or support structure on the boat in situations that require alternative attachment points beyond those provided by top or bottom mounting. FIG. 3B illustrates a modification to the preferred embodiment where the first mounting end portion 30 or second mounting end portion 40 also has an extension leg 50 for side mounting on the boat or support structure on the boat, but there are no machined holes in the support plate 10. The extension leg 50 provides the benefit of the allowing the support plate 10 to attach to numerous structures.

Figure 5:
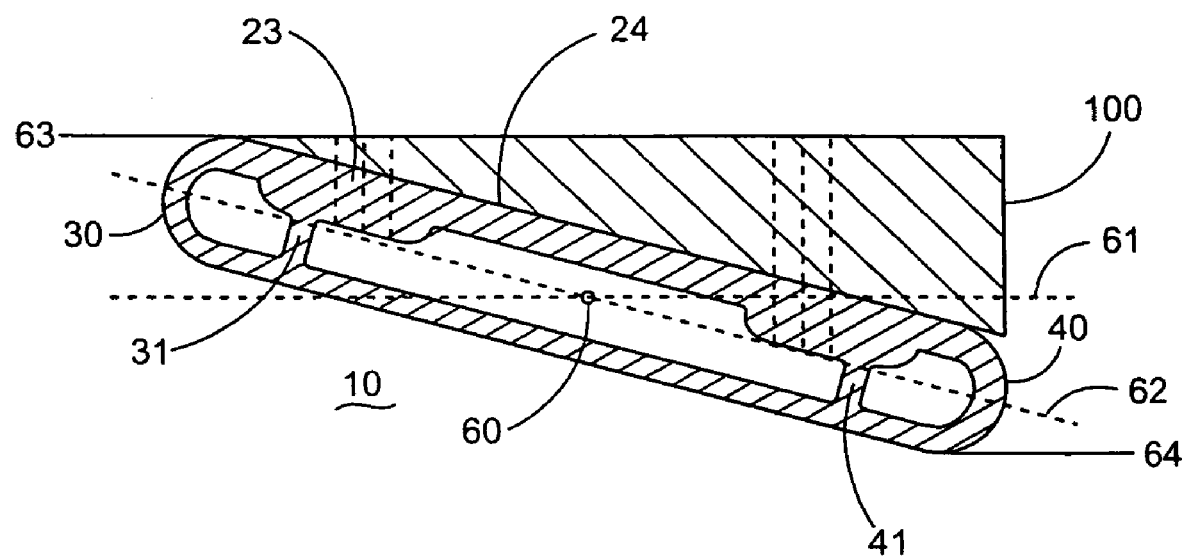
FIG. 5 is an illustration of a cross-sectional view of another embodiment of the present invention illustrated in FIG. 1.

Referring now to FIG. 5, within the support plate 10, the strengthening ribs 31 and 41 extend parallel to a longitudinal axis 60 of the support plate 10. The longitudinal axis 60 is within a first plane 61. The support plate 10 can be mounted in an angled manner wherein a second plane 62 is placed in a position so that it intersects the plane of the deck of the boat. With respect to the first plane 61, the first mounting end portion 30 is in a third plane 63 parallel to the first plane 61. With respect to the third plane 63, the second mounting end portion 40 is in a fourth plane 64 parallel to both the first plane 61 and the third plane 63. When the support plate 10 is mounted to the boat or support structure in this fashion, the central bore 24 and the bolt holes 23 are drilled in a manner that maintains a parallel relationship with respect to the longitudinal axis 60. A shim 100 or other spacer can be inserted between the angled support plate 10 and the boating accessory assembly. This permits the boating accessory assembly to be mounted to the support plate 10 through the shim 100 or other spacer so that the boating accessory assembly can rest in a plane parallel to the plane 61 of the longitudinal axis 60, as well as to planes 63 and 64.

As shown in FIG. 4, the center bore 24 can accommodate at least one center bore plug 70. The center bore plug 70 can be used as a cap for when there is no boating accessory assembly mounted in the support plate 10. Moreover, the bolt holes 23 can accommodate bolt hole plugs 71 in the event that bolts are either not required for mounting to the support plate 10, or in the event that no boating accessory assembly is mounted in the support plate 10. The caps 70 and 71 generally prevent the support plate 10, and particularly the bolt holes 23 and the interior of the support plate 10, from becoming over-exposed to harsh constituents, such as salt water.

In carrying out the method of the present invention for supporting a boating accessory, it is preferred that a multi-purpose support plate 10 having at least one strengthening rib 31 or 41 and at least one accessory bore, such as central bore 24 be mounted to a surface, such as a boat surface or boat support structure. It is further preferred that the boating accessory assembly be supplied through the accessory bore, such as central bore 24, and mounted to the multi-purpose support plate.

Although only a few exemplary embodiments of the present invention have been described in detail above, those skilled in the art will readily appreciate that numerous modifications are to the exemplary embodiments are possible without materially departing from the novel teachings and advantages of this invention. Accordingly, all such modifications are intended to be included within the scope of this invention as defined in the following claims.

What is claimed is:

1. A multi-purpose support plate with at least one cavity for use with a marine vessel accessory comprising:
   a first transverse end having a first extension leg for side mounting;
   a second transverse end;
   a first longitudinal end;
   a second longitudinal end;
   an upper layer; and
   a lower layer.

2. The support plate of claim 1, wherein said cavity cross-section in a transverse direction comprises:
   an upper interior surface;
   a lower interior surface;
   a first interior side surface; and
   a second interior side surface.

3. The support plate of claim 2, wherein a first strengthening rib of a specified thickness is positioned between a virtual center line and said first interior side surface and extends from said upper interior surface to said lower interior surface.

4. The support plate of claim 3, wherein a second strengthening rib of a specified thickness is positioned between a virtual center line and said second interior side surface and extends from said upper interior surface to said lower interior surface.

5. The support plate of claim 4, wherein said upper layer includes at least one region of a specified thickness.

6. The support plate of claim 5, wherein said specified thickness is increased at, and adjacent, the position where said first strengthening rib extends from said upper interior surface to said lower interior surface.

7. The support plate according to claim 6 wherein at least one bolt hole extends through said upper layer.

8. The support plate of claim 7, wherein said at least one bolt hole accommodates a bolt.

9. The support plate of claim 7 wherein said bolt hole extends through said upper layer into the cavity at a position adjacent a strengthening rib, and within the increased thickness of said upper layer.

10. The support plate of claim 6, wherein said thickness is extended inward, toward the cavity interior.

11. The support plate of claim 5, wherein said specified thickness is increased at, and adjacent, the position where said second strengthening rib extends from said upper interior surface to said lower interior surface.

12. The support plate of claim 1, wherein a bore hole is positioned intermediate between said first longitudinal end and said second longitudinal end and is positioned intermediate between said first transverse end and said second transverse end.

13. The support plate of claim 12, wherein said bore hole is configured to accommodate at least one marine vessel accessory.

14. The support plate of claim 1, wherein said second transverse end has an extension leg for side mounting.

15. The support plate of claim 1, wherein said extension leg is constructed to be mounted to a support structure on the vessel.

16. The support plate of claim 12, further comprising a bore plug disposed in said bore hole.

17. A multi-purpose support part for use with a marine vessel accessory, the part comprising:
a plate having a longitudinal axis and a hollow cross-section substantially perpendicular to said longitudinal axis;
said cross-section having a first rib running substantially parallel to said longitudinal axis and a second rib running substantially parallel to said longitudinal axis, said first rib and said second creating lateral cavities and a central cavity, said cross-section having at least one thickened region disposed in said central cavity.

18. The part according to claim 17, wherein said thickened region is configured for having at least one threaded bolt hole formed therein for a bolt of given diameter for mounting the accessory.

19. The part according to claim 18, wherein said thickened region has a thickness that is at least as great as the given diameter.

20. The part according to claim 18, wherein said thickened region has a thickness that is at least one and a half times as thick as the given diameter.

21. The part according to claim 18, wherein said central cavity has a through hole formed therein for receiving the marine vessel accessory.

22. The part according to claim 18, wherein at least one of said lateral cavities has at least one further thickened region disposed therein, said at least one further thickened region is configured for having at least one threaded bolt hole formed therein for a bolt of given diameter for mounting the accessory.

23. The part according to claim 18, wherein said at least one thickened region disposed in said central cavity extends to at least one of said lateral cavities.

24. A multi-purpose support part for use with a marine vessel accessory, the part comprising:
a first plate;
a second plate spacially separated from said first plate;
a first rib connecting said first plate to said second plate;
a second rib connecting said first plate to said second plate;
two opposing lateral walls disposed outside said first rib and said second rib, said two opposing lateral walls connecting said first plate to said second plate;
said first plate having at least one thickened region disposed between said first rib and said second rib.

25. The part according to claim 24, wherein said thickened region is configured for having at least one threaded bolt hole formed therein for a bolt of given diameter for mounting the accessory.

26. The part according to claim 25, wherein said thickened region has a thickness that is at least as great as the given diameter.

27. The part according to claim 25, wherein said thickened region has a thickness that is at least one and a half times as thick as the given diameter.

28. The part according to claim 25, further comprising a bore hole formed in said first plate and said second plate between said first rib and said second rib, said bore hole receiving the accessory.

29. The part according to claim 25, wherein said at least one thickened region is disposed between said first plate and said second plate.

30. A multi-purpose support part for use with a marine vessel accessory, the part comprising:
a first plate;
a second plate spacially separated from said first plate;
a first rib connecting said first plate to said second plate;
a second rib connecting said first plate to said second plate;
two opposing lateral walls disposed outside said first rib and said second rib and between said first plate and said second plate, said two opposing lateral walls connecting said first plate to said second plate;
said first plate having at least one thickened region disposed adjacent one of said first rib and said second rib; and
at least one threaded hole formed in said thickened region for holding the marine accessory.

31. The part according to claim 30, wherein said thickened region is disposed between said first plate and said second plate.

32. The part according to claim 30, wherein said at least one thickened region is a plurality of separated thickened regions each having at least one respective threaded hole formed therein.

33. The part according to claim 32, wherein some of said plurality of separated thickened regions are formed on said second plate.

34. The part according to claim 33, wherein a bore hole is formed in said first plate and said second plate for receiving the marine accessory.

* * * * *